Dec. 14, 1926.
H. F. FLOWERS
1,611,012
THREE-WAY DUMP MOTOR TRUCK BODY
Filed Sept. 27, 1924      6 Sheets-Sheet 1
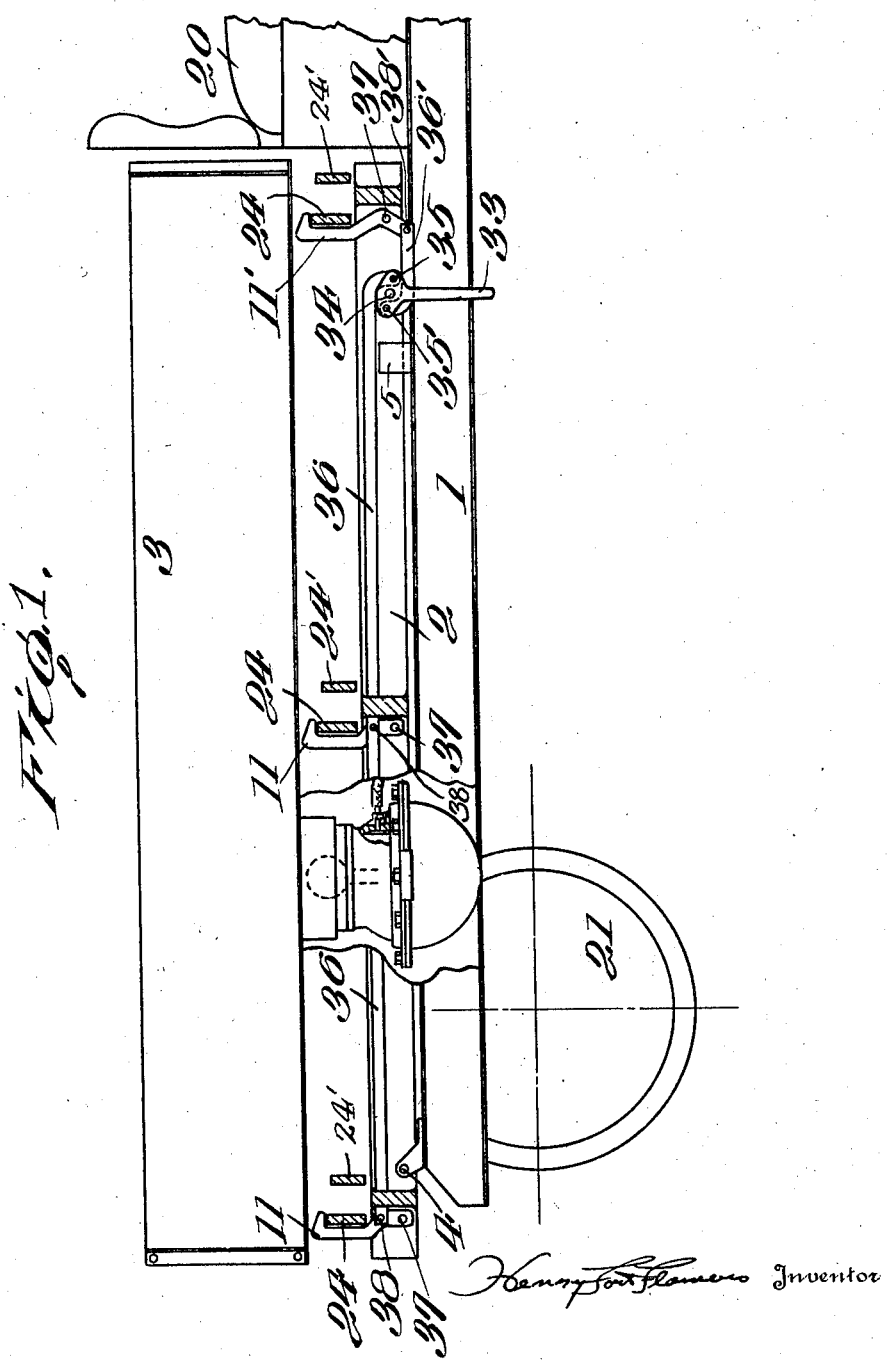

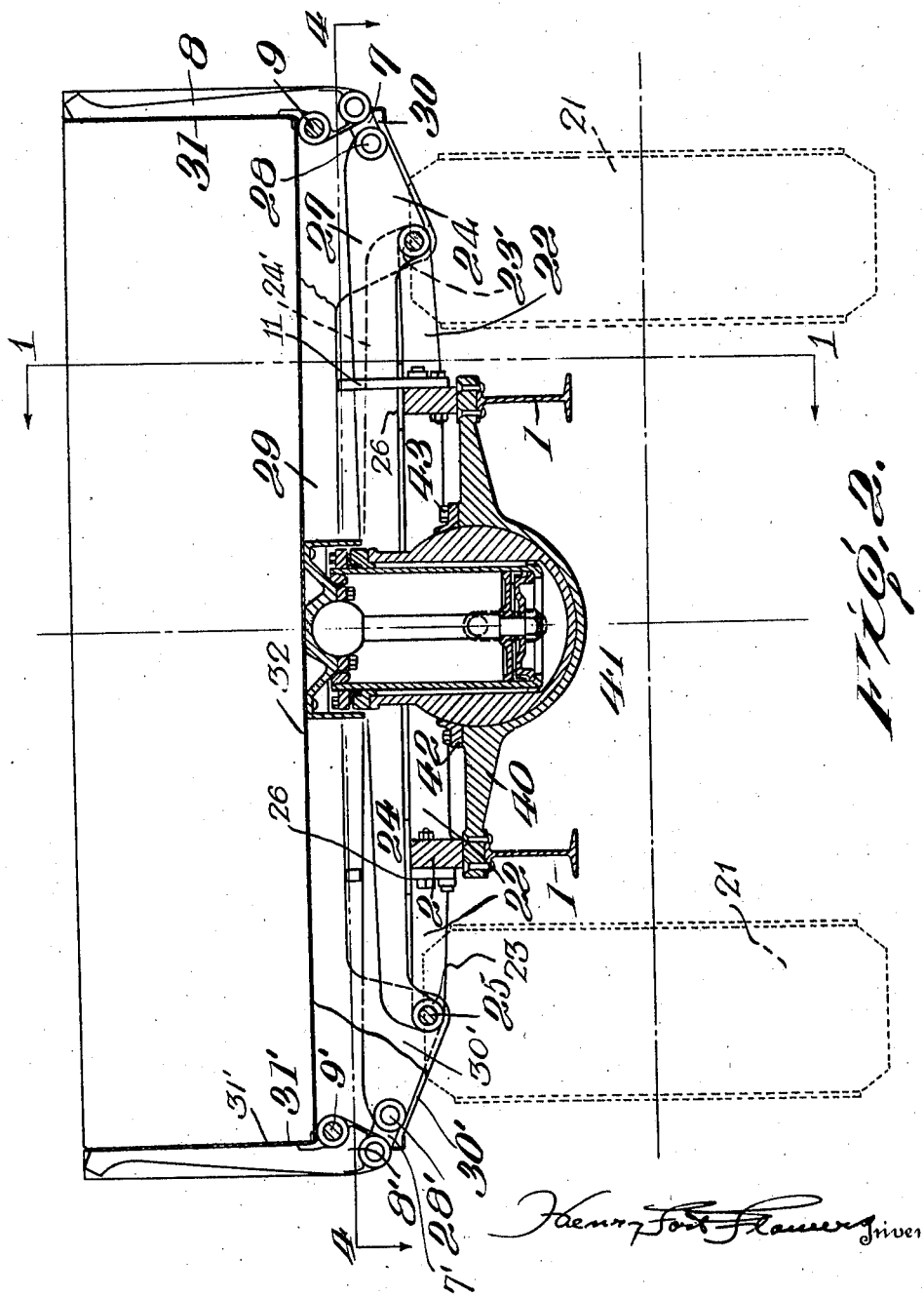

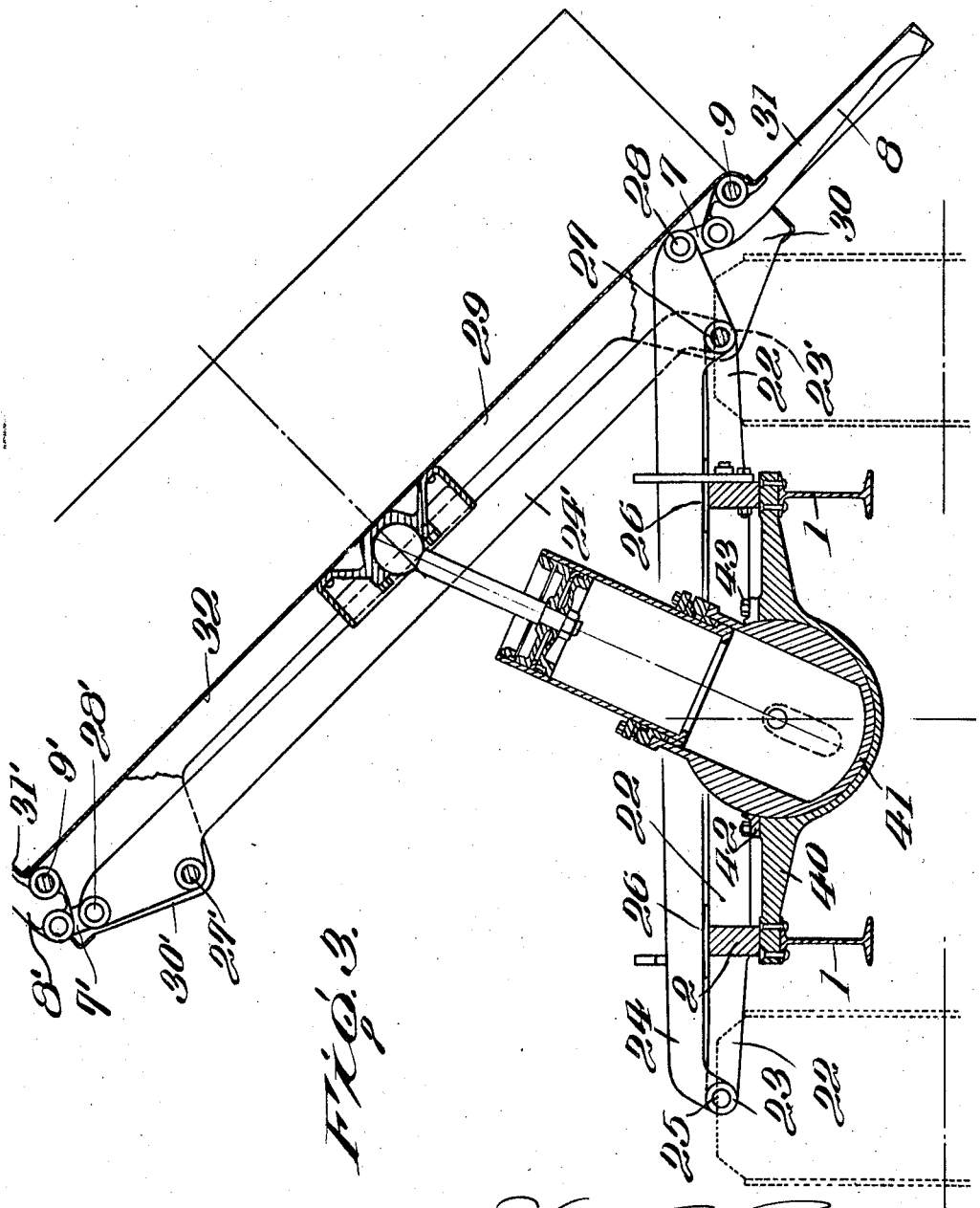

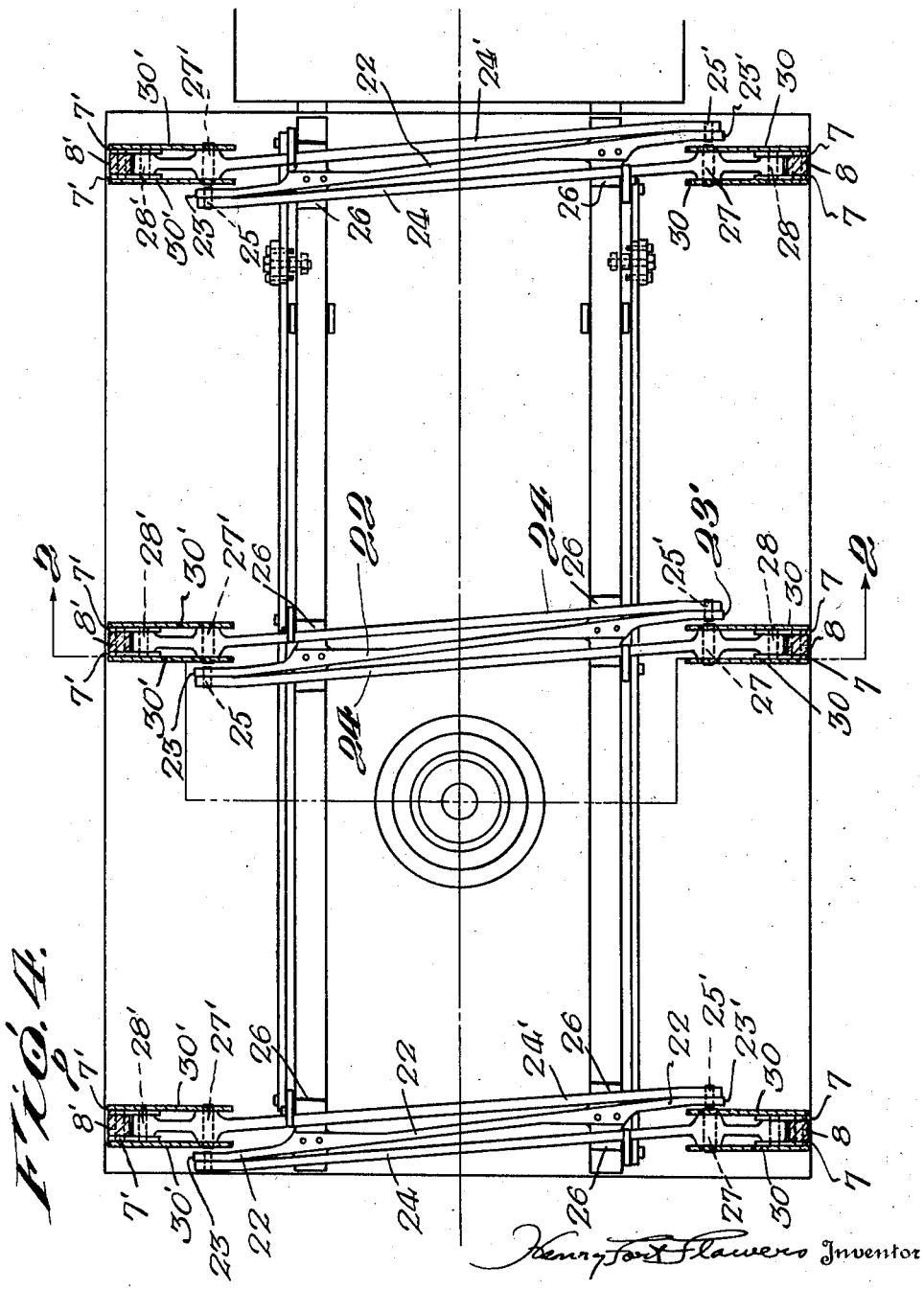

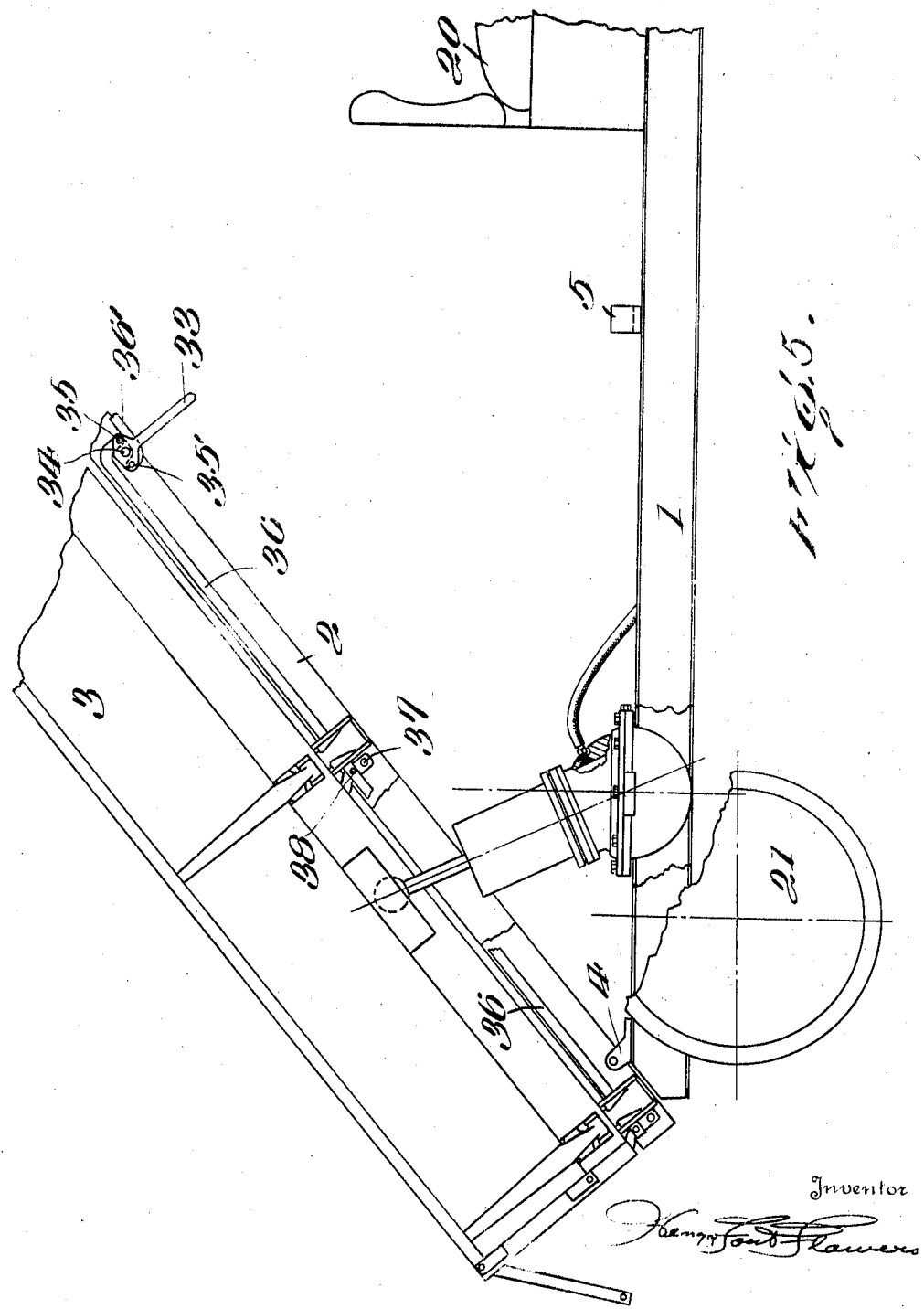

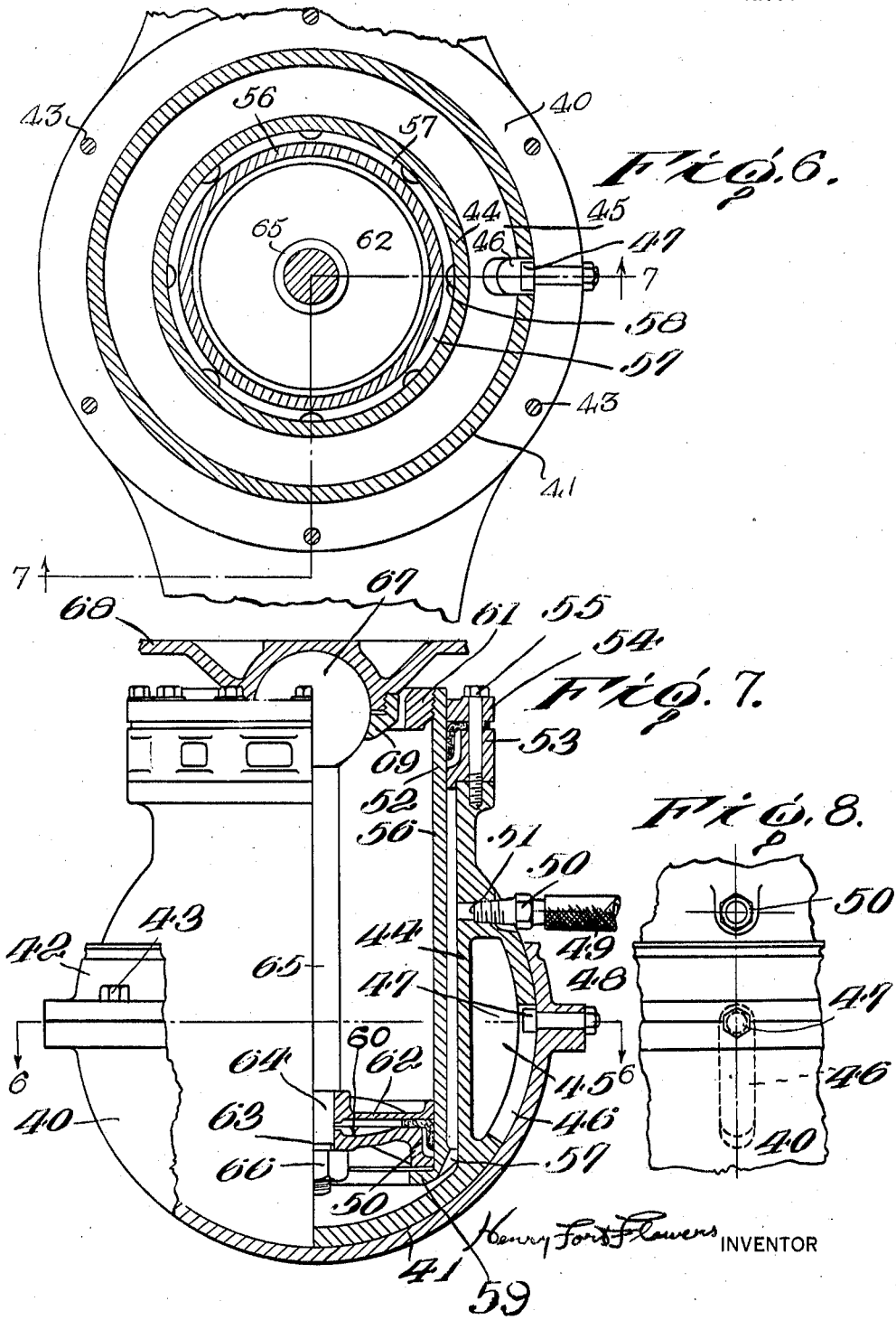

Patented Dec. 14, 1926.

1,611,012

UNITED STATES PATENT OFFICE.

HENRY FORT FLOWERS, OF FINDLAY, OHIO.

THREE-WAY-DUMP MOTOR-TRUCK BODY.

Application filed September 27, 1924. Serial No. 740,307.

The invention relates to new and useful improvements in dump vehicles, and more particularly to the means for supporting the body and controlling the opening and closing of the side doors therefor.

An object of the invention is to provide a dump vehicle which is supported on spaced fulcrums so that the load within the body portion of the vehicle will hold the body in stable equilibrium during transport, and which has door controlling devices which are independent of each other and which will operate independently, selectively and automatically to control the entire opening and closing movements of the door at the side at which dumping is to be effected when the body is tilted for dumping.

A further object of the invention is to provide a vehicle of the above type with door controlling devices which are selectively actuated by the tilting of the body and wherein the body operates through said devices to hold the doors closed during transport.

These and other objects will in part be obvious and will in part be hereinafter more fully disclosed.

In the drawings—

Fig. 1 is a longitudinal section on the line 1—1 of Fig. 2.

Fig. 2 is a transverse section on the line 2—2 of Fig. 4;

Fig. 3 is a section similar to Fig. 2, but with the body in tilted position;

Fig. 4 is a horizontal section on the line 4—4 of Fig. 2;

Fig. 5 is a side elevation showing the body tilted to the rear;

Fig. 6 is a horizontal section on the line 7—7 of Fig. 7;

Fig. 7 is a vertical section on the line 7—7 of Fig. 6; and

Fig. 8 is a fractional front elevation of the power unit showing the relation of the guide and slot.

The dump truck comprises a main frame 1 carrying a sub-frame 2 on which is mounted a dump body 3. The sub-frame 2 is supported on the main frame 1 by the pivots 4 at the rear end. In the normal or transport position, the sub-frame 2 is held in alined position relative to the main frame by lugs 5 on the main frame.

The truck also includes the usual driver's seat 20 and road wheels 21.

The sub-frame 2 includes a plurality of transverse carrier bars or links 22 which project on either side of the sub-frame 2, and have pivot eyes 23, 23' at the outer ends. The door actuating bars 24, 24', respectively, are pivotally mounted at alternate opposite sides of the vehicle at the eyes 23, 23' by means of the pivot bolts 25, 25' which define the trunnions or fulcrums at opposite sides of the vehicle about which the body tilts. These bars extend transversely across the sub-frame and rest during the normal position of the dump body on pads 26, 26 and the sub-frame 2. At the free ends of the bars 24, 24' they are, respectively, and alternately pivotally mounted at points 27, 27', which are in alignment with the pivotal points 25, 25' while the body is in the normal or transport position, but are independent thereof as shown in Fig. 4. At the extreme free ends of the bars 24, 24' they are pivoted as at 28, 28' to the short links 7, 7', which in turn are connected to the side doors 8, 8'.

The dump body includes a plurality of transverse stiffening frames 29 (Fig. 3) which have downwardly extending gusset members 30, 30' at their ends. These gussets 30, 30' receive the pivots 27, 27' of the transverse bars 24, 24' and the pivots 9, 9' for the doors 8, 8'. It will be seen that the doors comprise the frame or stiffening irons 8, 8'; and the sheeting 31, 31' which serves to contain the material in the dump body. The pivotal points 9, 9' for the doors are located immediately beneath the floor 32 of the dump body proper, which is curved downwardly at each side on a circular arc concentric with the centers of the relative pivots 9, 9' so that the door sheeting 31, 31' fits snugly against the floor plate 32 at all positions of the door and comes into close contact with the flooring 32 of the dump body when the doors are in normal or closed position.

During this opening movement, the body is raised from its stable position of normal transport against the action of gravity into a tilted position in which the material thereon may slide downward and outward at the side selected as a pivot for tilting, and past and over the door at that side. During the movement of the body to this tilted position, the door is regulated in the course of its movement so that it moves without any shock or excessive strain upon its connected members. With the down-folding door shown on the drawings, the door opens outwardly and downwardly not only by the action of the link 7, 7; but also by the weight of the material in the body, and by the action of gravity.

When the raising mechanism is thrown out of action and a return is permitted, the dump body returns from its tilted position into the normal transport position. During this return, the body rocks relative to the transverse bars which have remained stationary with the frame, and by a change of its relation to these bars, the door is caused to swing upward and into the closed position in a regulated manner dependent upon the movement of the body into its normal transport position under the action of gravity.

While the vehicle is being transported, the body rests in stable equilibrium upon the two fulcrum points at either side, so that "false dumping" or spilling will not occur, since both doors are held positively in the closed position by the action of the respective transverse arms and associated elements.

From the above it will be apparent that I have an arrangement whereby the body portion is mounted on spaced fulcrums so as to be maintained in stable equilibrium during transport. I have also provided a controlling mechanism for each door, and these controlling mechanisms are so constructed and arranged that they are operated upon the tilting of the body so as to control the opening and closing of the door only, through which dumping is to be effected, while the controlling mechanism for the other door holds the same closed. This controlling mechanism for the opening and closing of the door controls the entire movement of the door during the opening and closing thereof. Furthermore, the body operates through the controlling mechanisms to hold the doors closed. In other words, the door cannot be opened without a tilting of the body, and therefore, the body with its load during transport will positively hold the doors closed so that they cannot open even to a slight extent to allow the load to escape.

A latching system is provided on each side of the sub-frame 2, to engage the free ends of the bars 24, 24', respectively, i. e. each latch system locks the free ends of the bars 24, 24, 24 or 24', 24', 24' which are connected to the gusset plates 30, 30' at that side of the vehicle. This latch system comprises a handle 33 which is pivotally mounted at 34 to the sub-frame, and on the other hand, is pivotally connected at 35 to a link 36 extending lengthwise of the sub-frame, as shown in Fig. 1. Immediately beneath each of the transverse bars 24' in the section shown in Fig. 1, which represents the right-hand side of the vehicle, are pivotally mounted at points 37, a number of latch dogs 11 corresponding to the number of transverse bars 24' located to the rear of the handle 33. Each of these latch dogs 11 is connected as at 38 to the link 36. The latch dog 11' is pivotally connected to the sub-frame in a manner similar to that of the latch dog 11, but has a downwardly extending arm terminating in a pivot point 38' connected to the short link member 36', which in turn is operatively connected to the handle 33 at a point 35'.

The latch structure on the opposite or left-hand side of the vehicle, is similar to that described above, but as is apparent from Fig. 4, it is arranged to effect a latching by moving the upper portion of the latch dogs to the rear, instead of to the front as in Fig. 1. In this way, the left-hand system locks the transverse bars 24, 24, 24 instead of the transverse bars 24', 24', 24'. The entire door controlling mechanism is located beneath the floor of the body.

It is apparent from a consideration of Figures 1 and 3, that if the right-hand latch system is released from the transverse bars 24, that the transverse bars 24 may be rocked about their pivots 23' and the dump body 3 raised into the position shown in Fig. 3. During this movement of the dump body, the transverse bar 24 is held in its position by the latch dogs 11, so that the pivot points 23', 25' form a fixed line of rotation for the dump body. During this movement, further, the link 7 is pulled by the transverse bar 24, and the door 8 is swung downward into the position shown in Fig. 3. The door therefore forms a chute which will convey the contents of the dump body beyond the line of the vehicle wheels.

The power unit consists of a cylinder with a telescoping piston, and having ball and socket joints at the ends of the cylinder and of the piston. The unit is held on the vehicle by a casting 40 which is bolted at its ends to the main frame 1 of the truck, as shown in Fig. 3. Intermediate the ends, the casting is hollowed out as a spherical socket to receive the ball casting 41 of the power unit. This ball casting 41 is held in its allotted position in the casting 40 by means of the clamping ring 42 which is suitably bolted to the casting 40 by the bolts 43.

Turning to Figures 6 and 7, there is shown a detail on larger scale of the power unit. The casting 40 is shown as forming a hemispherical socket: i. e. the upper surface of the casting constitutes a horizontal central plane on a diameter of the ball casting 41. The ball casting 41 is made hollow to form a cylinder 44 for the power unit. The ball itself is formed otherwise as a mere shell, leaving the annular chamber 45 between this shell and the cylinder wall. The shell is slotted as shown at 46 in Fig. 8, to receive the enlarged end 47 of a bolt 48 secured in the outer casting 40. It will be seen that this bolt acts as a retaining or guide member to prevent the movement of the ball in its socket in other than a substantially vertical plane. Inasmuch as the power unit moves only to the right or left, or to the rear, it is unnecessary to provide for its forward movement, and hence the slot 46 is shown to terminate a short distance above the bolt 47.

The power medium comprising a fluid under pressure is admitted to the cylinder of the power unit through a conduit 49 connected to the pump or reservoir on the automobile by means of piping or flexible hose, or both, as desired. This conduit 49 terminates in a connecting member 50 which is screwed into the threaded aperture 51 in the ball casting 41. It will be understood that a suitable valve is located at some point in the pipe line 49, for manual control of the actuation of the power unit.

The cylinder 44 is provided at its upper end with a packing ring 52. This packing consists of an annulus of leather or other material bent into an L-shape in its cross section. The packing ring 52 is received between the guide rings 53 and 54 which are secured to the ball casting 41 by means of bolts 55.

The outer piston-cylinder 56 is cylindrical in its external shape, with a slight flange 57 at its bottom, which serves as a guide and stop for this cylinder 56. This flange is traversed by a series of passages 58, as shown in Fig. 6, which serve to admit the power medium from the annular space between the cylinder 56 and the inner wall of the ball casting 41, to the end of the cylinder 56.

The cylinder 56 likewise has an inwardly projecting flange 59, which serves as a stop for the inner piston 60. The upper end of the cylinder 56 is threaded on the inside to receive a stop ring 61 which limits the upward movement of this piston 60.

The inner piston comprises the dished plates 60, 62 which in diameter closely approximate the internal diameter of the cylinder 56, and receive between them the annular packing ring 63 of leather or similar material, formed L-shaped in cross section. These two plates 60, 62 are clamped together on the lower end 64 of the piston rod 65. As will be seen in Fig. 7, the lower end 64 of the piston rod is of reduced diameter to afford a stop shoulder for the plate 62, and the extreme end of the piston rod receives a clamping nut 66 to assure the proper clamping of the packing ring.

At its upper end, the piston rod 65 carries a ball 67. This ball is received in a socket member 68 fixedly connected to the bottom of the dump body 3. The ball is retained in the socket member 68 by a clamping ring 69.

It will be noted that the socket assembly 68, 69 may be received within the cylinder 56 and within the elements 53, 54 associated with the ball casting 41. This assures compactness and saving of space when the power unit is entirely collapsed.

The method of operation of the power unit is as follows: When the power medium is admitted through the pipe 49 to the annular space comprised between the inner wall of the ball casting 41 and the cylinder 56, this medium passes downward and through the passages 58 to the space beneath the piston plate 60. As the pressure builds up, the piston 60 and the cylinder 56 are driven upwardly, with regard to each other and to the ball casting 41, until the flange 57 is stopped by the lower inwardly projecting surface of clamping ring 53, and the piston plate 62 is limited by the stop ring 61. The body is limited at the extreme angular position against a further movement with regard to the frame in this manner, and as will be seen in Fig. 3, the center of gravity of the empty body is to the left of the trunnion 25' and hence the body will return by gravity to the normal transport position from the tilted position shown in Fig. 3; and a corresponding limitation prevails when the body is tilted to the opposite side. This constitutes the extreme extension of the power unit and represents the fully tilted position of the dump body. Upon release of the pressure within the ball casting by changing over the valve in the pipe line 49, the fluid medium is permitted to escape from beneath piston 60 and the dump body slowly settles into its former position.

As the body is tilted, the door opens by its own weight and the weight of the material contained in the body and gradually coming to bear against it in proportion as the body moves: the links 7, 7' respectively may also exert a traction upon the depending bracket member on the door to pull it open. The door at the lower side of the tilted body is thus opened, while the door at the upper side is maintained closed: during transport and at all times while the body is in the normal horizontal position, each door controlling mechanism retains its respective side door closed.

When the power is released, the body is permitted to return by gravity from its tilted to its normal position. During this return, the respective door controlling mechanism positively closes the associated door which has opened.

During a tilting movement of the body, one set of the transverse bars or links 24, 24' moves with the body to maintain its respective door closed; while the other set remains fixed with the frame to actuate the other or lower door as necessary. During such movement, the pivot 9 or 9' of the respective door at the lower side of the body will have a movement relative to the adjacent projecting ends of the transverse bars 24, 24', to which in the illustration it is connected by the link 7 or 7'.

In the foregoing specification, the device has been described as applied to an automobile truck. It will be understood, however, that the principle of the invention is not limited to this specific application; nor to the precise details of construction shown, but that any construction may be employed within the scope of the appended claims.

Having thus described the invention, what I claim as new and desire to secure by Letters-Patent, is—

1. In a dump vehicle, a frame, a dump body rockable selectively about fulcrums at opposite sides of the vehicle for dumping, a side door pivoted to the said body at each side thereof, and an automatic controlling mechanism for each door permanently connected to the said body adjacent the door controlled thereby and to the frame at the opposite side thereof, said connection to the frame being substantially at the line where the body fulcrums on the frame when tilting to dump, so that said controlling mechanism is operative to hold its respective door closed during transport and to hold it closed during tilting for dumping at the side opposite the door, and operative to control the opening and closing of the door during tilting for dumping at the adjacent side.

2. In a dump vehicle, a frame, a dump body having a pivot member at each side of said frame, a first link connected to one of said pivot members and extending transversely across said frame and pivoted thereto at its opposite end, a second link connected to the other said pivot member and extending transversely across said frame and pivoted thereto at its opposite end, a side door pivoted to said dump body at each side thereof, and means operatively connecting said links and said doors to actuate the lower door when said dump body is tilted for dumping.

3. In a dump vehicle, a frame, a dump body adapted to tilt about trunnions upon said frame for dumping to either side, a link connected to said frame in the line of one of said trunnions and extending transversely across said frame and connected to the dump body in the line of the other of said trunnions, a side door for said dump body adjacent said latter trunnion, and a connection between said link and said door to hold the same closed during travel and during tilting about the former trunnion and to open and close said door during movement of the dump body about the latter trunnion.

4. In a dump vehicle, a frame, transverse links connected alternately at one end to opposite sides of said frame, a dump body pivotally mounted adjacent the respective other end of each of said links, a side door pivotally mounted on said dump body at each side thereof, and link connections between said doors and the adjacent latter ends of said links.

5. In a dump vehicle, a frame, transverse links connected alternately at one end to opposite sides of said frame, a dump body pivotally connected to said links at the other ends thereof, a side door pivotally connected on said dump body at each side thereof, and link connections between said doors and the adjacent said other ends of said links to positively open and close either of said doors during a movement of the dump body about the adjacent pivotal connection.

6. In a dump vehicle, an underframe and a tilting dump body pivotally connected thereto by transverse arms extending across said underframe and alternately mounted by a trunnion at one side of said underframe at one end of each of said arms and by a pivot connection to the other side of the body at the other end of each of said arms, a door pivoted to said body at each side thereof, and link connections between each of said doors and said alternately mounted arms, said transverse arms being pivotally connected to said frame at the lines of said trunnions at the opposite sides of said vehicle.

7. In a dump vehicle, a frame, a dump body rockable selectively about fulcrums at opposite sides of the vehicle for dumping, a side door pivoted to the said body at each side thereof, and a controlling mechanism for each door located beneath the body and permanently connected to the said body adjacent the door controlled thereby and to the frame at the opposite side thereof, said connection to the frame being substantially at the line where the body fulcrums on the frame when tilting to dump, so that said controlling mechanism is operative to hold its respective door closed during transport and to hold it closed during tilting for dumping at the side opposite the door, and operative to control the opening of the door during tilting for dumping at the adjacent side and to control the door during its entire closing movement during the return of the body from such tilted position.

8. In a dump vehicle having an underframe and a body tiltable about fulcrums at opposite sides of the underframe, a door at each side of said body and pivotally supported thereby, and door operating devices for each of said doors having connections to the said body and being pivoted to said underframe substantially at the fulcrum on the side opposite said respective doors.

9. In a dump vehicle, a frame, a dump body rockable selectively about fulcrums at opposite sides of the vehicle for dumping, said fulcrums being spaced apart laterally so that the dump body is in stable equilibrium above said frame during transit, means to prevent said body from being tilted relative to said frame to a position in which its center of gravity when empty is beyond the vertical plane through the respective selected fulcrum, a side door for said body pivoted thereto at each side thereof, and a door operating device for each of said doors connected to said frame and said body substantially at the respective fulcrum lines opposite to and adjacent the door controlled by said device so that said body during its gravitational return from tilted position may, through the respective devices positively close the door at the side selected for tilting, and so that the device associated with the other door shall hold the same closed during such tilting and return therefrom.

10. In a dump vehicle, a frame, a dump body rockable selectively about fulcrums at opposite sides of said frame for dumping to the respective sides of the vehicle, depending members rigidly connected to said body at each side thereof, a side door pivoted to said body at each side thereof, and a controlling mechanism for each door connected to said depending members at the side adjacent the door controlled thereby and substantially at the line where the body fulcrums on the frame when tilting to dump to such side, and connected to the said frame at the opposite side thereof and substantially at the line where the body fulcrums on the frame when tilting to dump on such opposite side.

11. In a dump vehicle, a frame, a dump body rockable selectively about fulcrums at opposite sides of said frame for dumping to the respective sides of the vehicle, depending members connected to said body at each side thereof, a side door pivoted to said body at each side thereof, and a mechanism for controlling the opening and closing movement of each door, said mechanism being connected to said depending members at the side adjacent the door controlled thereby and connected to the said frame at the opposite side thereof and substantially at the line where the body fulcrums on the frame when tilting to dump on such opposite side.

12. In a dump vehicle, a frame, a dump body rockable selectively about fulcrums at opposite sides of said frame, means for selectively tilting said body, a side door for said body pivoted thereto at each side thereof, a door controlling means for each door including a member secured to said body at the side adjacent the door controlled thereby, and a connection between each of said door controlling members and the frame so disposed that the member controlling the door at the lower side of the tilted body remains in substantially fixed relation with the frame while the member controlling the door at the other side remains in substantially fixed relation with the body, so that the door at the upper side of the body is maintained closed during dumping, and the door at the lower side of the body is controlled during its opening and closing movement.

13. In a dump vehicle, a frame, a dump body rockable selectively about fulcrums at opposite sides of said frame and extending therebeyond, transverse links connected alternately at one end to said frame substantially at the place where the body fulcrums thereon for tilting to the respective side, connections between each of said links and said body at the side opposite the aforesaid connection of said respective link to the frame, and a member connected to each of said links and projecting outward laterally beyond said frame, a side door pivoted to said body at each side thereof, and means on said doors to cooperate with the respective outwardly projecting members to positively close said respective door during the return of said body from tilted position.

14. In a dump vehicle, a frame, a dump body rockable selectively about fulcrums at opposite sides of said frame, said fulcrums supporting said body and being separated a sufficient distance so that the body when in normal carrying position will remain stable in transit, means for selectively tilting said body, a side door for said body at each side thereof, and independent devices for each door connected to said frame and body and located beneath said body and extending across the frame from one side thereof to the other for independently and selectively moving said respective doors from opened to closed position during the return of said body from tilted position.

15. In a dump vehicle, an underframe, a dump body, laterally spaced parallel trunnions supporting said dump body on said underframe for selective tilting in either direction, said trunnions being spaced apart so that said body is in stable equilibrium above said underframe during transit, a side door pivoted at each side of said dump body to fold down, and independent means for each door connected to said body at one side and to said underframe at the other side, and to said respective doors to open the door adjacent the trunnion selected for tilting during such tilting, and serving to hold said dump body against lateral displacement upon said underframe.

16. In a dump vehicle, a frame, a dump body rockable selectively about fulcrums at opposite sides of said frame, said fulcrums being spaced apart so that said dump body is supported in stable equilibrium thereon during normal transport, a side door for said body at each side thereof, and independent devices for each door automatically, independently and selectively controlling the opening and closing of the door through which dumping is to be effected, throughout the entire movement thereof, said body operating through said devices for holding the doors closed when said body is supported on both fulcrums for transport.

17. In a dump vehicle, a frame, a dump body rockable selectively about fulcrums at opposite sides of said frame, said fulcrums being spaced apart so that said dump body is supported in stable equilibrium thereon during normal transport, a side door for said body at each side thereof, said doors being hinged to the body to fold down for opening, and independent devices for each door for automatically, independently and selectively controlling the opening and closing of the door through which dumping is to be effected, throughout the entire movement thereof, said body operating through said devices for holding the doors closed when said body is supported on both fulcrums for transport.

18. In a dump vehicle, a frame, a dump body rockable selectively about fulcrums at opposite sides of said frame, said fulcrums being spaced apart so that said dump body is supported in stable equilibrium thereon during normal transport, a side door located at each side of and hinged to the body to fold down for opening, and independent mechanisms for each door, each including interconnected devices located beneath said body and attached to the body and to the frame for automatically, independently and selectively controlling the opening and closing of the door through which dumping is to be effected, throughout the entire movement thereof, said body operating through said devices for holding the doors closed when said body is supported on both fulcrums for transport.

In testimony whereof, I affix my signature.

HENRY FORT FLOWERS.